(12) United States Patent
Schmieg et al.

(10) Patent No.: US 8,006,481 B2
(45) Date of Patent: Aug. 30, 2011

(54) METHOD AND APPARATUS TO SELECTIVELY REDUCE $NO_x$ IN AN EXHAUST GAS FEEDSTREAM

(75) Inventors: Steven J. Schmieg, Troy, MI (US); Richard J. Blint, Shelby Township, MI (US); Ling Deng, Sterling Heights, MI (US); Michael B. Viola, Macomb Township, MI (US); Jong-Hwan Lee, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1377 days.

(21) Appl. No.: 11/533,434

(22) Filed: Sep. 20, 2006

(65) Prior Publication Data

US 2008/0066456 A1    Mar. 20, 2008

(51) Int. Cl.
 *F01N 3/00* (2006.01)
(52) U.S. Cl. ............... 60/286; 60/274; 60/278; 60/285; 60/295; 60/301
(58) Field of Classification Search ............ 60/274, 60/278, 285, 286, 295, 301, 303
See application file for complete search history.

(56) References Cited

U.S. PATENT DOCUMENTS

| | | | |
|---|---|---|---|
| 5,357,749 A * | 10/1994 | Ohsuga et al. ............ 60/274 |
| 5,586,433 A | 12/1996 | Boegner et al. | |
| 5,606,856 A | 3/1997 | Linder et al. | |
| 5,727,385 A | 3/1998 | Hepburn | |
| 5,921,076 A * | 7/1999 | Krutzsch et al. ........... 60/274 |
| 5,980,844 A * | 11/1999 | Kharas ................. 423/213.2 |
| 6,038,854 A * | 3/2000 | Penetrante et al. ......... 60/297 |
| 6,284,211 B1 | 9/2001 | Miyadera et al. | |
| 6,293,096 B1 * | 9/2001 | Khair et al. ............... 60/286 |
| 6,311,484 B1 | 11/2001 | Roth et al. | |
| 6,805,849 B1 | 10/2004 | Andreasson et al. | |
| 7,063,642 B1 * | 6/2006 | Hu et al. ................. 477/100 |
| 7,134,273 B2 * | 11/2006 | Mazur et al. .............. 60/286 |
| 7,389,638 B2 * | 6/2008 | Weissman et al. .......... 60/286 |
| 7,743,602 B2 * | 6/2010 | Kalyanaraman et al. ..... 60/286 |
| 2004/0170548 A1 | 9/2004 | Johnston Bartley et al. | |
| 2005/0002843 A1 | 1/2005 | Kim et al. | |
| 2006/0029535 A1 | 2/2006 | Ott | |
| 2006/0075742 A1 | 4/2006 | Lee | |
| 2010/0024400 A1 * | 2/2010 | Liu et al. ................. 60/286 |
| 2010/0077733 A1 * | 4/2010 | Winkler et al. ............ 60/286 |

OTHER PUBLICATIONS

Shelef, M.,Selective Catalytic Reduction of NOx with N-Free Reductants, Chem. Rev., 1995, pp. 209-225, vol. 95, American Chemical Society, USA.
Twigg, Martyn V., Automotive Exhaust Emissions Control, Platinum Metals Rev., 2003, 47,(4), pp. 157-162.
Kass, Michael D., et al., Selective Catalytic Reduction of Diesel Engine NOx Emissions using Ethanol as a Reductant, US DOE 9th DEER Conf., Newport, RI, Aug. 2003, pp. 1-9.
West, Brian, et al., In-Cylinder Production of Hydrogen during Net-Lean Diesel Operation, SAE Tech Paper, Apr. 2006, 2006-01-0212, SAE Warrendale, PA.

* cited by examiner

*Primary Examiner* — Tu M Nguyen

(57) ABSTRACT

A method and apparatus are described to selectively reduce $NO_x$ emissions of an internal combustion engine. An exhaust aftertreatment system includes an injection device operative to dispense a hydrocarbon reductant upstream of a silver-alumina catalytic reactor device. A control system determines a $NO_x$ concentration and hydrocarbon/NOx ratio based upon selected parameters of the exhaust gas feedstream and dispenses hydrocarbon reductant during lean engine operation. Included is a method to control elements of the feedstream during lean operation. The hydrocarbon reductant may include engine fuel.

30 Claims, 11 Drawing Sheets

US 8,006,481 B2

METHOD AND APPARATUS TO SELECTIVELY REDUCE $NO_x$ IN AN EXHAUST GAS FEEDSTREAM

GOVERNMENT CONTRACT RIGHTS

The U.S. Government has a paid-up license in this invention and the right in limited circumstances to require the patent owner to license others on reasonable terms as provided for by the terms of DE-FC26-02NT41218 awarded by the U.S. Department of Energy.

TECHNICAL FIELD

This invention pertains generally to exhaust aftertreatment systems for internal combustion engines.

BACKGROUND OF THE INVENTION

Manufacturers of internal combustion engines develop engine control strategies to satisfy customer demands and meet various regulations for emissions and fuel economy. One such engine control strategy comprises operating an engine at an air/fuel ratio that is lean of stoichiometry to improve fuel economy and reduce greenhouse gas emissions. Such operation is possible using compression-ignition (diesel) and lean-burn spark-ignition engines. When an engine operates with lean (excess oxygen) air/fuel ratio, the resultant combustion temperature is lower, leading to decreased engine-out $NO_x$ emissions; However, commercial application of lean-operating engines is limited due to lack of effective methods to remove $NO_x$ under a lean exhaust condition. Thus, efficient reduction of nitrogen oxides ($NO_x$=$NO$+$NO_2$) from diesel and lean-burn gasoline exhaust is important to meet future emission standards and improve vehicle fuel economy.

Reduction of $NO_x$ emissions from an exhaust feedstream containing excess oxygen is a challenge for vehicle manufacturers. By way of example, it is estimated that compliance with Bin 5 regulations in the United States may require an aftertreatment system capable of 70-90% $NO_x$ conversion efficiency on the FTP (Federal Test Procedure) cycle based on currently anticipated engine-out $NO_x$ levels. For practical application, the conversion efficiency must be obtained at a low temperature operating range (e.g., 200-350° C.) occurring during the aforementioned FTP cycle and at a higher temperature operating range (e.g., 450-550° C.) occurring during a high speed test cycle (e.g., US06 federal test procedure).

Several potential aftertreatment systems have been proposed for vehicle applications. One approach comprises using an aftertreatment system including injecting a $NO_x$ reductant, e.g., urea, upstream of an urea-SCR catalyst, to reduce $NO_x$ to $N_2$. Use of urea as a reductant necessitates a urea distribution infrastructure and an on-vehicle monitoring system for this secondary fluid, and may have potential problems in cold weather climates due to the relatively high freezing point (−12° C.) of the urea solution. $NO_x$ storage catalysts typically require large catalyst volumes, large amounts of platinum-group metals and low sulfur fuel for efficient storage operation. Such systems require periodic catalyst regeneration involving fuel injection to generate high exhaust gas temperatures and injection of reductants to regenerate the storage material of the catalyst.

Selective catalytic reduction of $NO_x$ using hydrocarbons (HC—SCR) has been studied extensively as a potential alternative method for the removal of $NO_x$ under oxygen-rich conditions. Ion-exchanged base metal zeolite catalysts (e.g., Cu-ZSM5) have typically not been sufficiently active under typical vehicle operating conditions, and are susceptible to degradation by sulfur dioxide and water exposure. Catalysts employing platinum-group metals (e.g., $Pt/Al_2O_3$) operate effectively over a narrow temperature window and are highly selective towards $N_2O$ production.

Catalytic devices using alumina-supported silver (Ag/$Al_2O_3$) have received attention because of their ability to selectively reduce $NO_x$ under lean exhaust conditions with a wide variety of hydrocarbon species. The use of partially oxidized hydrocarbons (e.g., alcohols) over Ag/$Al_2O_3$ allows reduction of $NO_x$ at lower temperatures. However such reductants are unavailable on-board the vehicle. Previous HC—SCR over Ag/$Al_2O_3$ catalysts utilized light hydrocarbons (e.g., propene, propane) and heavier fuel-component hydrocarbons (e.g., octane, decane) as a reductant. $NO_x$ reduction using lighter hydrocarbons present in engine exhaust as the combustion products yield conversion at higher temperature, but for Ag/$Al_2O_3$ catalysts to be considered as candidates for practical use, the NO reduction must be shifted to a lower temperature region and the fuel on-board the vehicle must be used as the reductant.

Therefore, there is a need for an effective method and apparatus to selectively reduce $NO_x$ in an exhaust gas feedstream for vehicles and other applications of lean-burn internal combustion engines.

SUMMARY OF THE INVENTION

In accordance with an embodiment of the invention, there is provided a method and apparatus to selectively reduce $NO_x$ emissions of an internal combustion engine, including an exhaust aftertreatment system comprising a silver-alumina catalytic reactor device and a device operative to dispense a hydrocarbon reductant into the exhaust gas feedstream upstream of the silver-alumina catalytic reactor device. A control system is adapted to determine a parametric measure of $NO_x$ gases in the exhaust gas feedstream; and, dispensing hydrocarbon reductant into the exhaust gas feedstream upstream of the silver-alumina catalytic reactor device based upon the parametric measure of $NO_x$ gases. This includes determining a preferred hydrocarbon/$NO_x$ ratio; and, dispensing the hydrocarbon reductant into the exhaust gas feedstream upstream of the silver-alumina catalytic reactor device based upon the preferred hydrocarbon/$NO_x$ ratio, preferably during lean operation of the internal combustion engine.

Another aspect of the invention includes a method to selectively control elements of an exhaust gas feedstream of an internal combustion engine during lean operation, comprising determining a preferred hydrocarbon/$NO_x$ ratio based upon selected parameters of the exhaust gas feedstream. A hydrocarbon reductant is dispensed into the exhaust gas feedstream upstream of the silver-alumina catalytic reactor device. The preferred hydrocarbon/$NO_x$ ratio comprises a $HC_1$/$NO_x$ ratio optimized to lower the $NO_x$ concentration of the exhaust gas feedstream through the silver-alumina catalytic reactor device based upon the selected parameters. The selected parameters of the exhaust gas feedstream comprise an inlet temperature to the silver-alumina catalytic reactor device, mass flow rate, $NO_x$ concentration, and, oxygen concentration. The method further comprises selectively dispensing a mass of hydrogen into the exhaust gas feedstream upstream of the silver-alumina catalytic reactor device generated either from an external device or an engine control strategy. The hydrocarbon reductant comprises engine fuel.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, the embodiments of which are described in detail and illustrated in the accompanying drawings which form a part hereof, and wherein.

DETAILED DESCRIPTION OF AN EMBODIMENT OF THE INVENTION

Figure 1:
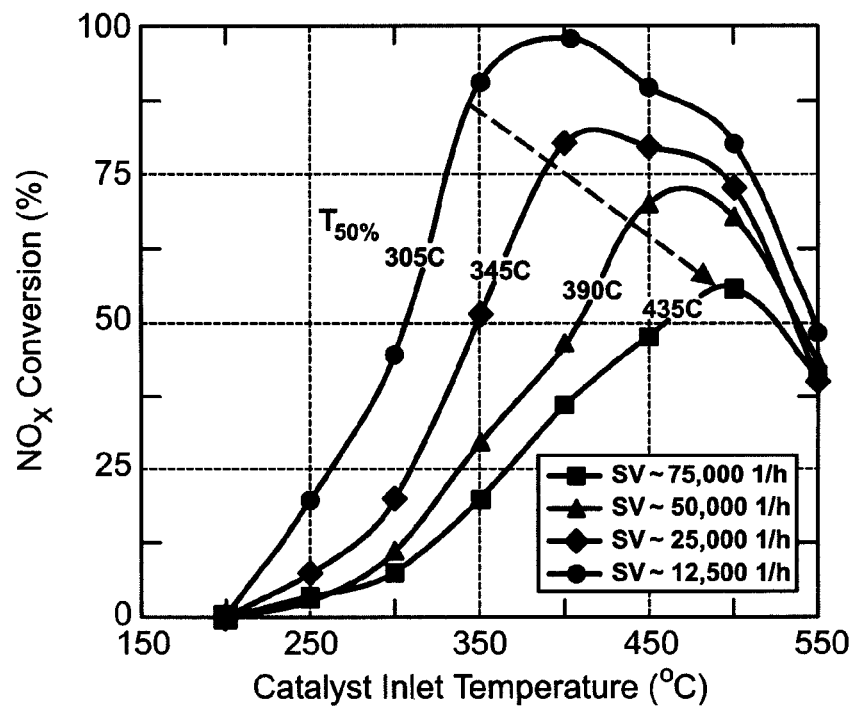
FIGS. 1-19 are datagraphs, in accordance with the present invention.

Referring now to the drawings, wherein the showings are for the purpose of illustrating the invention only and not for the purpose of limiting the same, a method, preferably executed as a control algorithm in an on-vehicle control module, is provided to selectively reduce $NO_x$ concentration in an exhaust gas feedstream of an internal combustion engine during lean operation. The method comprises determining a parametric measure of $NO_x$ gases in the exhaust gas feedstream, and determining a preferred hydrocarbon/$NO_x$ ratio based upon parameters of the exhaust gas feedstream. A hydrocarbon-based reductant, e.g., fuel, is selectively dispensed into the exhaust gas feedstream upstream of a silver-alumina catalytic reactor device, to effect $NO_x$ reduction therein while limiting slip of hydrocarbons therethrough. The preferred hydrocarbon/$NO_x$ ratio comprises a $HC_1/NO_x$ ratio optimized to effect reduction of a $NO_x$ concentration of the exhaust gas feedstream in the silver-alumina catalytic reactor device based upon the aforementioned selected parameters. The parameters of the exhaust gas feedstream preferably comprise a temperature of the catalyst, a mass flow rate of the exhaust gas feedstream, and $NO_x$ and oxygen concentrations in the exhaust gas feedstream. A further embodiment of the invention can include dispensing a mass of hydrogen into the exhaust gas feedstream upstream of the silver-alumina catalytic reactor device. A further embodiment of the invention can include controlling oxygen in the exhaust gas feedstream upstream of the silver-alumina catalytic reactor device.

The exemplary silver-alumina ('Ag—Al') catalytic reactor device comprises a catalytic device utilizing silver alumina as the catalytic material and comprising 2 wt. % $Ag_2O$ supported on alumina, for results shown with regard to FIGS. 1-15. The catalytic material was supported on a 400 cell per square inch cordierite monolith substrate. The catalytic device was hydro-thermally aged employing air and 10% water at 650° C. for 16 hours prior to testing. It is understood that the specifics of the catalytic device are meant to be exemplary to demonstrate the control strategy described herein. Other silver-containing catalytic devices may be useable depending upon specific application details. As described hereinbelow, other washcoat loadings and silver loadings are examined and affect details of the control strategy. Silver ('Ag') loading is shown to be an important parameter affecting $NO_x$ reduction and catalytic performance, with a range of silver loadings (typically around 1-3 wt. %, with an optimum value around 2 wt. %) promoting higher $NO_x$ conversions, likely due to increased dispersion.

Referring now to FIGS. 1-19, representative data graphs comprising results achieved by executing aspects of the method by selectively injecting HC fuel upstream of the exemplary Ag—Al catalyst are shown. The results described in the data graphs were developed using a laboratory reactor to flow a simulated exhaust gas feedstream over a sample of the Ag—Al catalyst applied on 400 cell-per-square inch cordierite monolith substrate, with the lab reactor using simulated diesel fuel. The aftertreatment system was instrumented with appropriate sensors, including a magneto-pneumatic exhaust gas analyzer to determine $O_2$ concentration in the exhaust, a Fourier transform infrared spectrometer to determine $NO_x$ concentration levels entering and exiting the exemplary catalyst, and a flow meter to determine exhaust flow rate translatable to catalyst space velocity (SV). Space velocity represents a rate of feed of exhaust gas, in volume, per unit volume of the catalyst, and has a unit of inverse hour ($h^{-1}$).

Baseline laboratory conditions included the following standard gases in the simulated exhaust feedstream: 10% $O_2$, 5% $CO_2$, 5% $H_2O$, 750 parts per million (hereinafter 'ppm') CO, and 250 ppm $H_2$. The simulated diesel fuel mixture used as the $NO_x$ reductant for all laboratory reactor work consisted of a volumetric mixture of n-dodecane (67 vol. %, long-chain alkane) and m-xylene (33 vol. %, aromatic). The effect of space velocity, $NO_x$ as NO or $NO_2$, and concentration effects of $O_2$, $NO_x$, $H_2$, and HC were evaluated as a function of catalyst inlet temperature.

FIG. 1 comprises a graphical depiction of test results showing $NO_x$ conversion (%) across the sample of the Ag—Al catalyst, plotted as a function of catalyst inlet temperature (C) wherein SV ranged from 12,500 $h^{-1}$ to 75,000 $h^{-1}$, with an exhaust gas feedstream comprising 10% oxygen, 5% $H_2O$, 5% $CO_2$, 750 ppm CO, 250 ppm $H_2$, 250 ppm NO, and 187 ppm of the simulated diesel fuel to provide a $HC_1:NO_x$ ratio of approximately 8:1.

Figure 2:
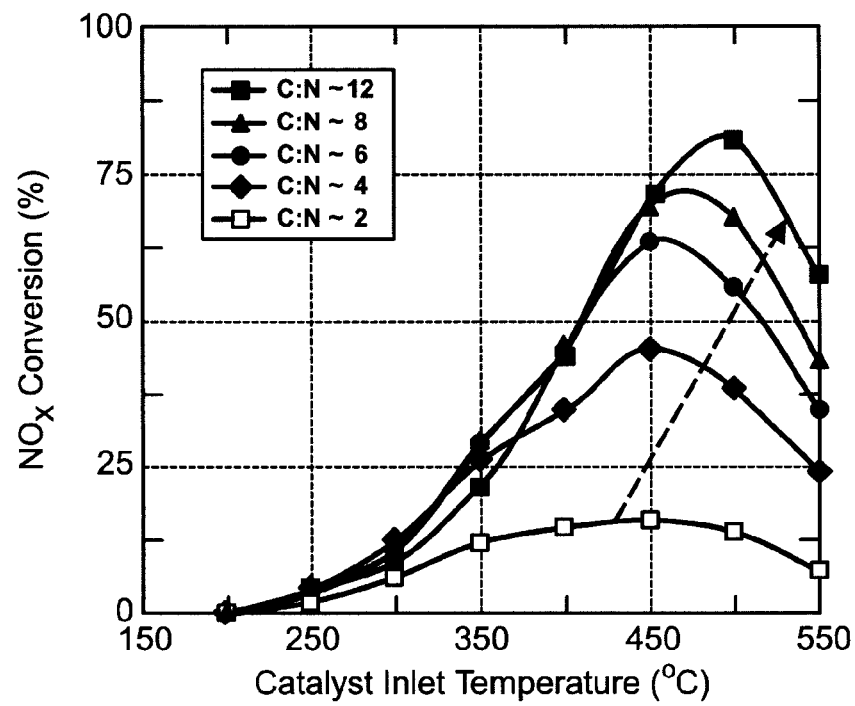

FIG. 2 comprises a graphical depiction of test results showing $NO_x$ conversion (%) across the sample of the Ag—Al catalyst, plotted as a function of catalyst inlet temperature (C) wherein SV was 50,000 $h^{-1}$, with an exhaust gas feedstream comprising 10% oxygen, 5% $H_2O$, 5% $CO_2$, 750 ppm CO, 250 ppm $H_2$, 250 ppm NO, and varying quantities of the simulated diesel fuel to provide a $HC_1:NO_x$ ratio of ranging from approximately 2:1 to 12:1.

Figure 3:
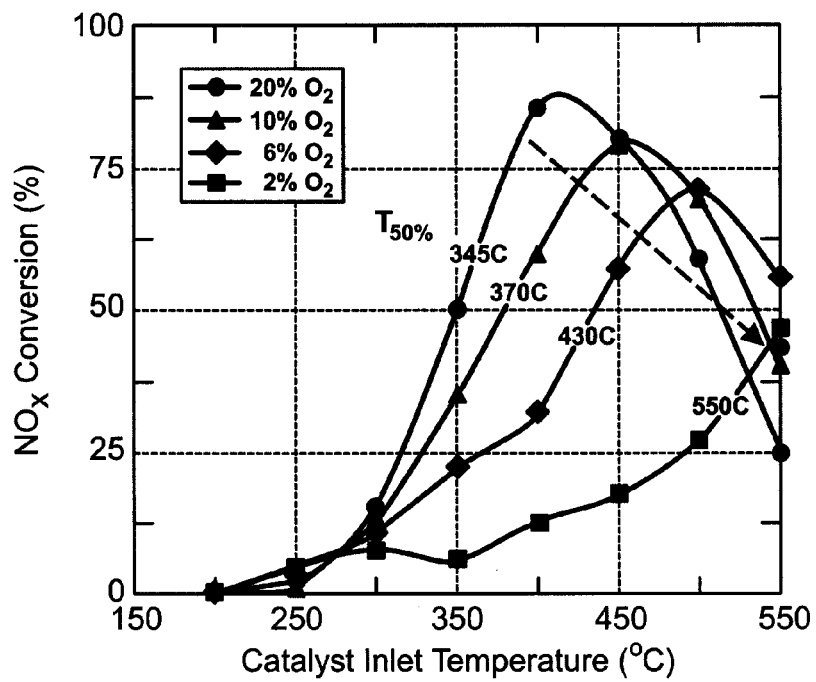

FIG. 3 comprises a graphical depiction of test results showing $NO_x$ conversion (%) across the sample of the Ag—Al catalyst, plotted as a function of catalyst inlet temperature (C) wherein SV was 50,000 $h^{-1}$, with an exhaust gas feedstream comprising oxygen ranging from 2% to 20%, 5% $H_2O$, 5% $CO_2$, 750 ppm CO, 250 ppm $H_2$, 250 ppm NO, and 187 ppm of the simulated diesel fuel to provide a $HC_1:NO_x$ ratio of approximately 8:1.

Figure 4:
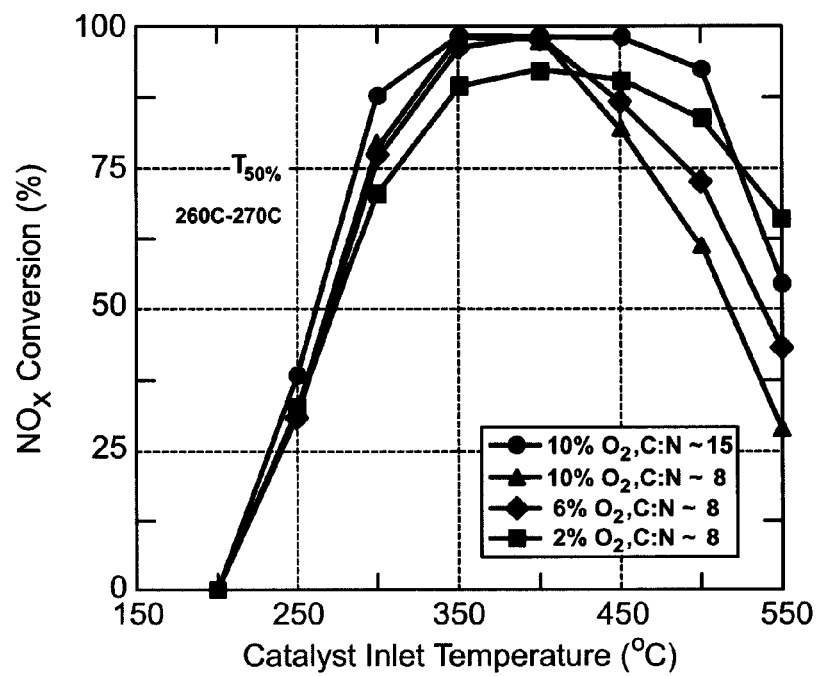

FIG. 4 comprises a graphical depiction of test results showing $NO_x$ conversion (%) across the sample of the Ag—Al catalyst, plotted as a function of catalyst inlet temperature (C) wherein SV was 12,500 $h^{-1}$, with an exhaust gas feedstream comprising oxygen ranging from 2% to 10%, 5% $H_2O$, 5% $CO_2$, 750 ppm CO, 250 ppm $H_2$, 100 ppm NO, and 79 ppm of the simulated diesel fuel to provide a $HC_1:NO_x$ ratio of approximately 8:1. Additionally, an exhaust gas feedstream comprising 10% oxygen, 5% $H_2O$, 5% $CO_2$, 750 ppm CO, 250 ppm $H_2$, 100 ppm NO, and 158 ppm of the simulated diesel fuel to provide a $HC_1:NO_x$ ratio of approximately 15:1 is shown.

Figure 5:
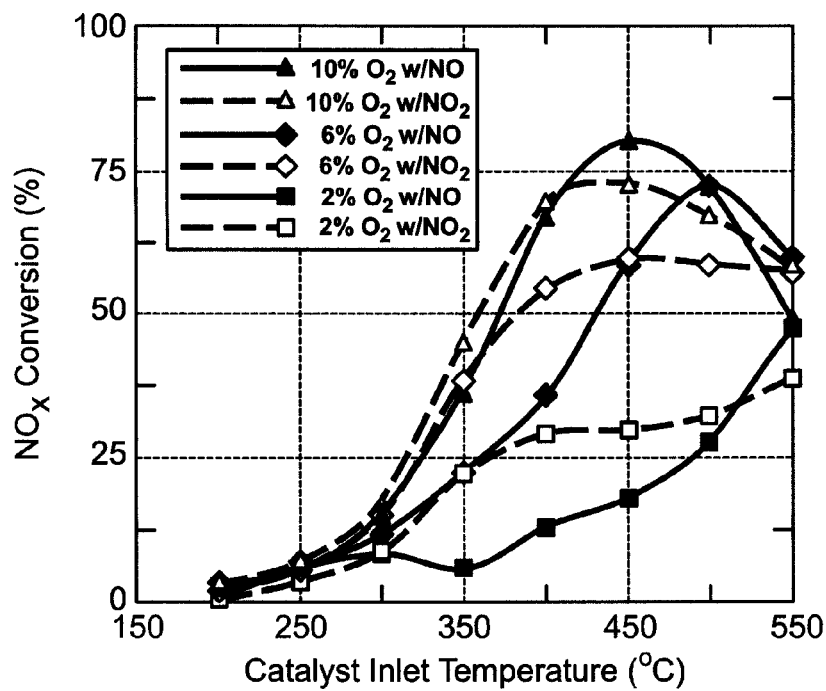

FIG. 5 comprises a graphical depiction of test results showing $NO_x$ conversion (%) across the sample of the Ag—Al catalyst, plotted as a function of catalyst inlet temperature (C) wherein SV was 50,000 $h^{-1}$, with an exhaust gas feedstream comprising oxygen ranging from 2% to 10%, 5% $H_2O$, 5%

$CO_2$, 750 ppm CO, 250 ppm $NO_x$ (NO or $NO_2$), and 187 ppm of the simulated diesel fuel to provide a $HC_1$:$NO_x$ ratio of approximately 8:1.

Figure 6:
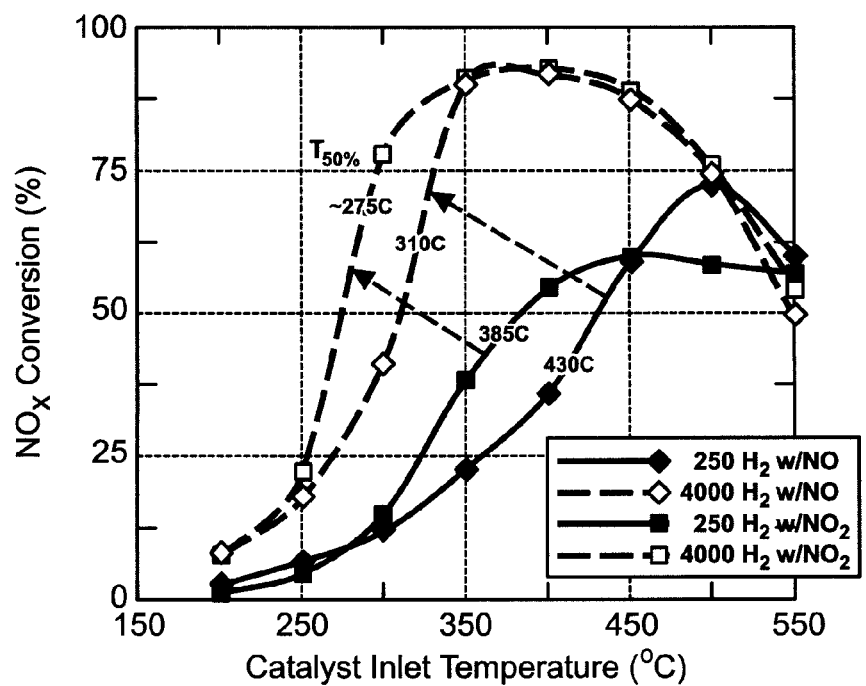

FIG. 6 comprises a graphical depiction of test results showing $NO_x$ conversion (%) across the sample of the Ag—Al catalyst, plotted as a function of catalyst inlet temperature (C) wherein SV was 50,000 $h^{-1}$, with an exhaust gas feedstream comprising 6% oxygen, 5% $H_2O$, 5% $CO_2$, 750 ppm CO, 250 or 4000 ppm $H_2$, 250 ppm $NO_x$ (NO or $NO_2$), and 187 ppm of the simulated diesel fuel to provide a $HC_1$:$NO_x$ ratio of approximately 8:1.

Figure 7:
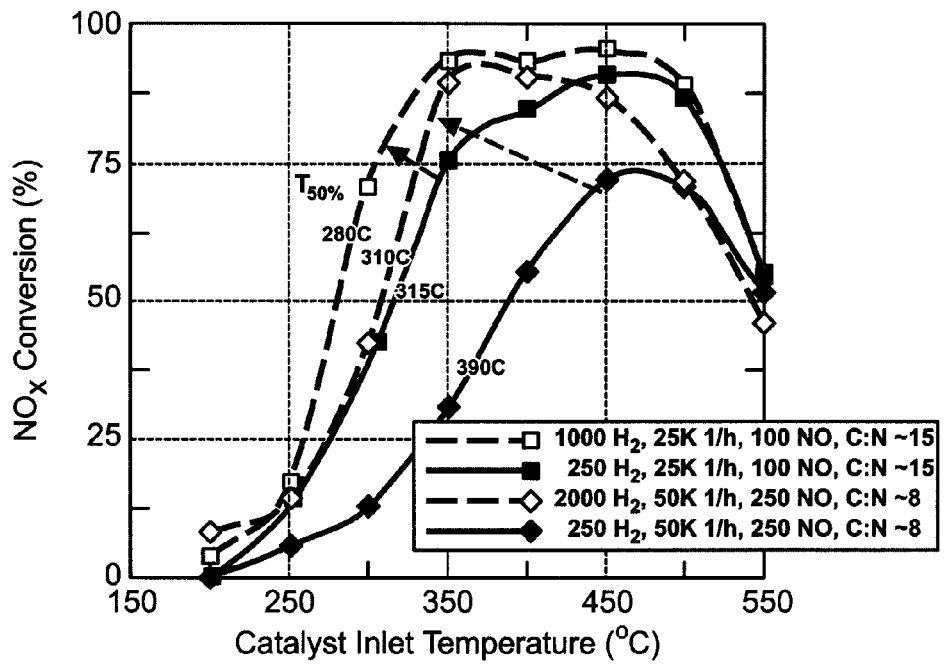

FIG. 7 comprises a graphical depiction of test results showing $NO_x$ conversion (%) across the sample of the Ag—Al catalyst, plotted as a function of catalyst inlet temperature (C) wherein SV was 25,000 $h^{-1}$, with an exhaust gas feedstream comprising 10% oxygen, 5% $H_2O$, 5% $CO_2$, 750 ppm CO, 250 or 1000 ppm $H_2$, 100 ppm NO, and 151 ppm of the simulated diesel fuel to provide a $HC_1$:$NO_x$ ratio of approximately 15:1 or SV was 50,000 $h^{-1}$, with an exhaust gas feedstream comprising 10% oxygen, 5% $H_2O$, 5% $CO_2$, 750 ppm CO, 250 or 2000 ppm $H_2$, 250 ppm NO, and 187 ppm of the simulated diesel fuel to provide a $HC_1$:$NO_x$ ratio of approximately 8:1.

Figure 8:
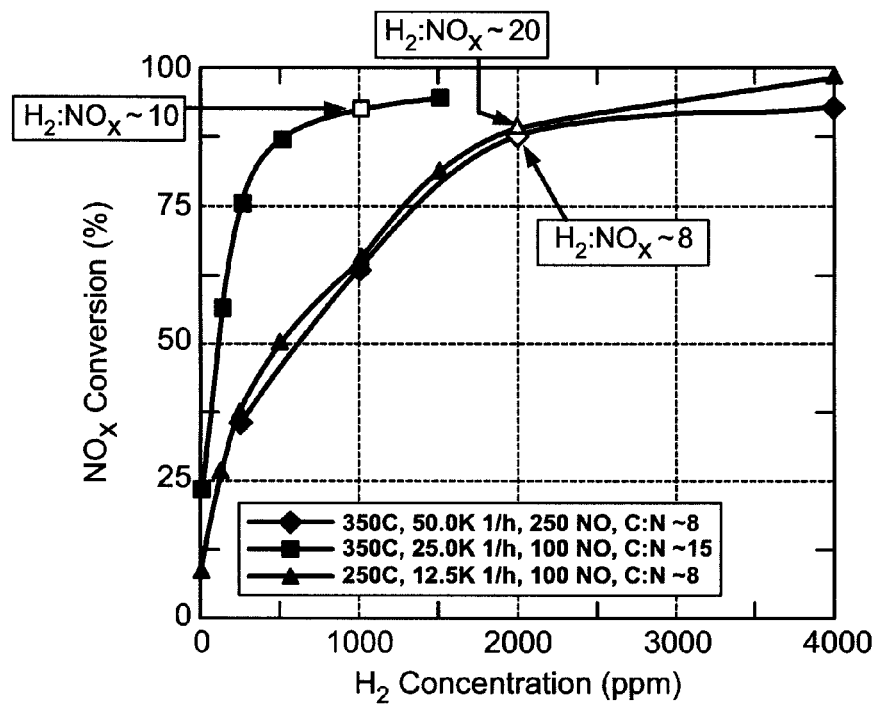

FIG. 8 comprises a graphical depiction of test results showing $NO_x$ conversion (%) across the sample of the Ag—Al catalyst, plotted as a function of $H_2$ concentration, wherein SV ranged from 12,500 to 50,000 $h^{-1}$ and exhaust gas temperature was 250 or 350° C., with an exhaust gas feedstream comprising 10% oxygen, 5% $H_2O$, 5% $CO_2$, 750 ppm CO, 100 or 250 ppm NO, and varying ppm of the simulated diesel fuel to provide a $HC_1$:$NO_x$ ratio varying from approximately 8:1 to 15:1.

Figure 9:
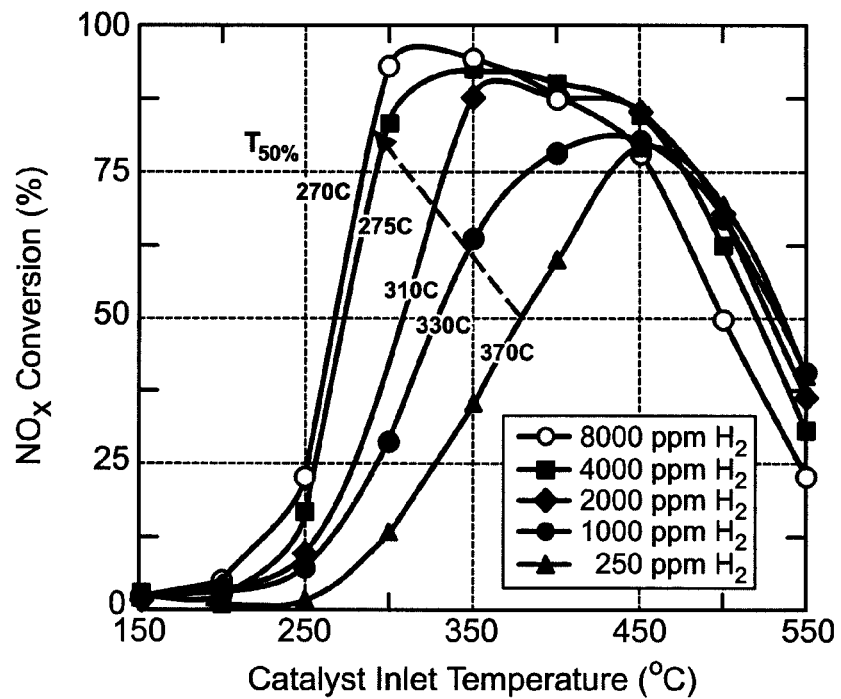

FIG. 9 comprises a graphical depiction of test results showing $NO_x$ conversion (%) across the sample of the Ag—Al catalyst, plotted as a function of catalyst inlet temperature (C) wherein SV was 50,000 $h^{-1}$, with an exhaust gas feedstream comprising 10% oxygen, 5% $H_2O$, 5% $CO_2$, 750 ppm CO, and a range of 250 to 8000 ppm $H_2$, 250 ppm NO, and 187 ppm of the simulated diesel fuel to provide a $HC_1$:$NO_x$ ratio of approximately 8:1.

Figure 10:
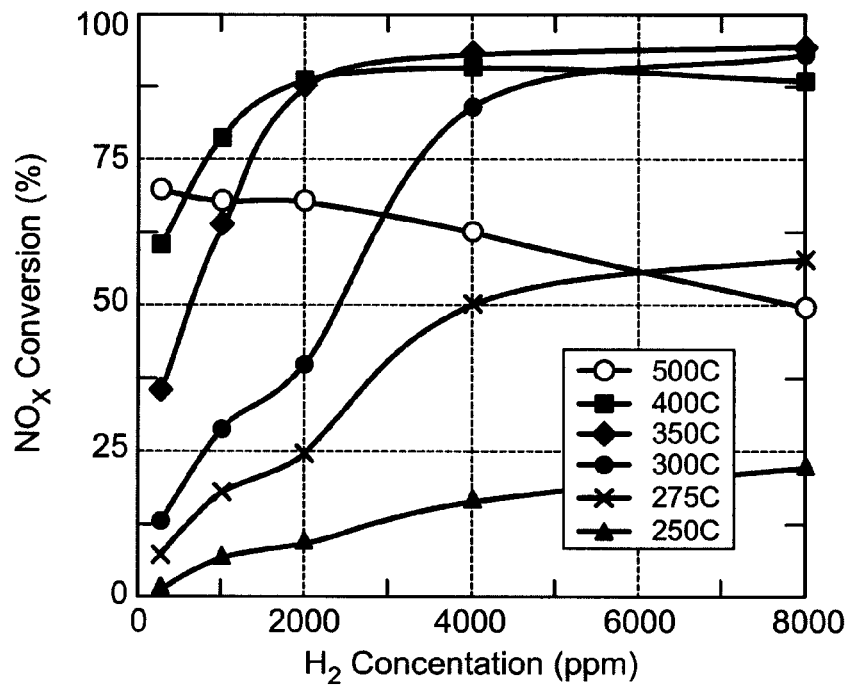

FIG. 10 comprises a graphical depiction of test results showing $NO_x$ conversion (%) across the sample of the Ag—Al catalyst, plotted as a function of $H_2$ concentration, wherein SV was 50,000 $h^{-1}$, with an exhaust gas feedstream comprising 10% oxygen, 5% $H_2O$, 5% $CO_2$, 750 ppm CO, 250 ppm NO, and 187 ppm of the simulated diesel fuel to provide a $HC_1$:$NO_x$ ratio of approximately 8:1.

Figure 11:
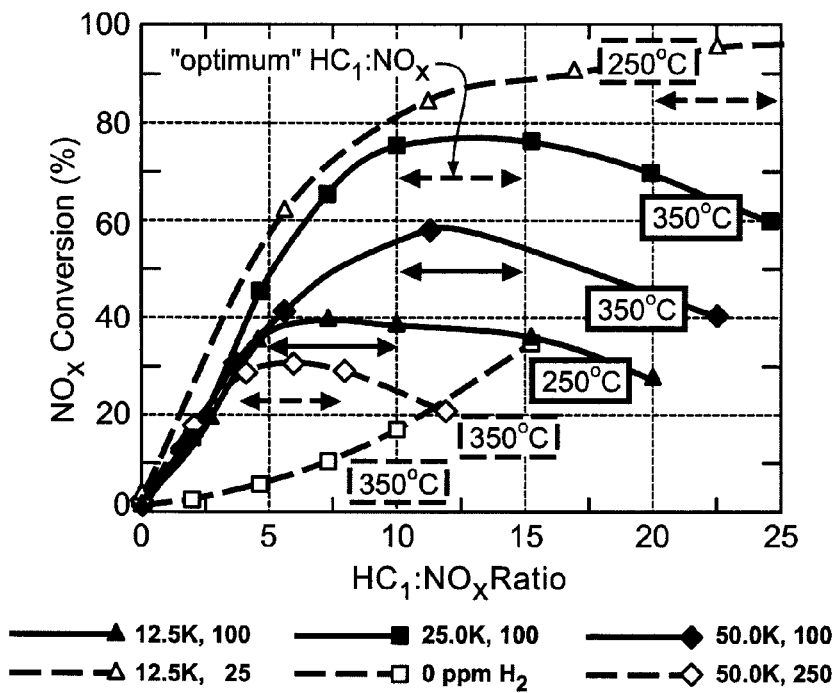

FIG. 11 comprises a graphical depiction of test results showing $NO_x$ conversion (%) across the sample of the Ag—Al catalyst, plotted as a function of $HC_1$:$NO_x$ ratio wherein SV ranged from 12,500 to 50,000 $h^{-1}$ and exhaust gas temperature was 250 or 350° C., with an exhaust gas feedstream comprising 10% oxygen, 5% $H_2O$, 5% $CO_2$, 750 ppm CO, 250 or 0 ppm $H_2$, 25, 100, or 250 ppm NO, and varying ppm of the simulated diesel fuel with the $HC_1$:$NO_x$ ratio ranging from 0 to 25:1. Results indicate optimum $HC_1$:$NO_x$ operating ratios.

Figure 12:
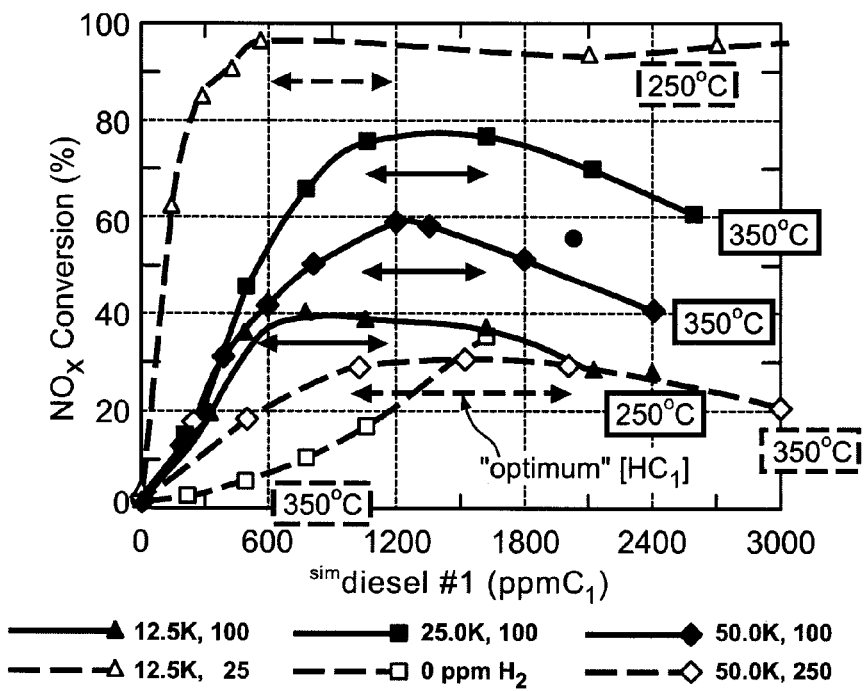

FIG. 12 comprises a graphical depiction of test results showing $NO_x$ conversion (%) across the sample of the Ag—Al catalyst, plotted as a function of reductant concentration, comprising simulated diesel fuel, measured in ppm$C_1$, wherein SV ranged from 12,500 to 50,000 $h^{-1}$ and exhaust gas temperature was 250 or 350° C., with an exhaust gas feedstream comprising 10% oxygen, 5% $H_2O$, 5% $CO_2$, 750 ppm CO, 250 or 0 ppm $H_2$, 25, 100, or 250 ppm NO, and varying ppm of reductant comprising simulated diesel fuel with the $HC_1$:$NO_x$ ratio ranging from 0 to 25:1. Results indicate optimum $HC_1$ operating amounts (in ppm, $C_1$).

Figure 13:
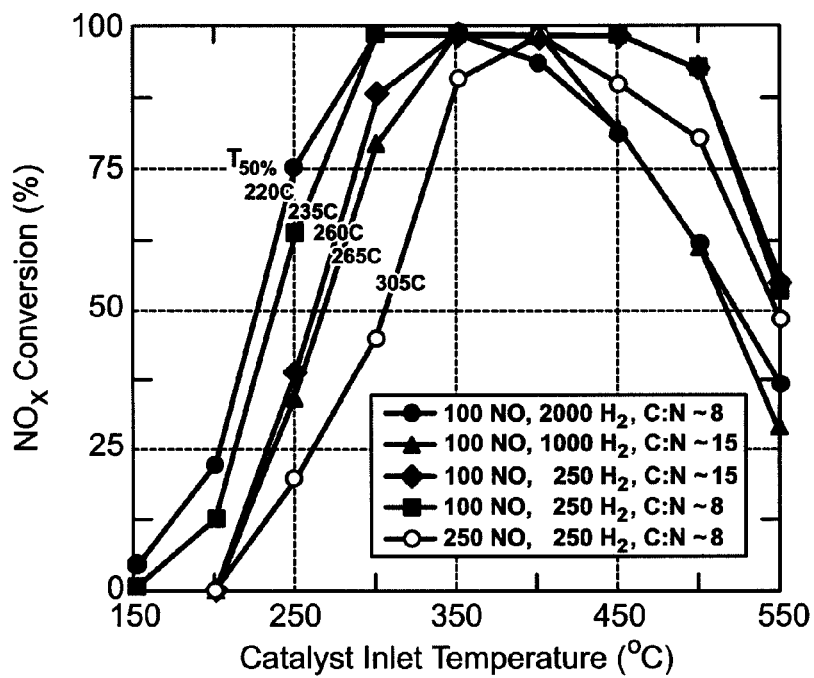

FIG. 13 comprises a graphical depiction of test results showing $NO_x$ conversion (%) across the sample of the Ag—Al catalyst, plotted as a function of catalyst inlet temperature (C) wherein SV was 12,500 $h^{-1}$, with an exhaust gas feedstream comprising 10% oxygen, 5% $H_2O$, 5% $CO_2$, 750 ppm CO, a range of 250 to 2000 ppm $H_2$, 100 or 250 ppm NO, and varying ppm of the simulated diesel fuel to provide a $HC_1$:$NO_x$ ratio ranging from approximately 8:1 to 15:1.

Figure 14:
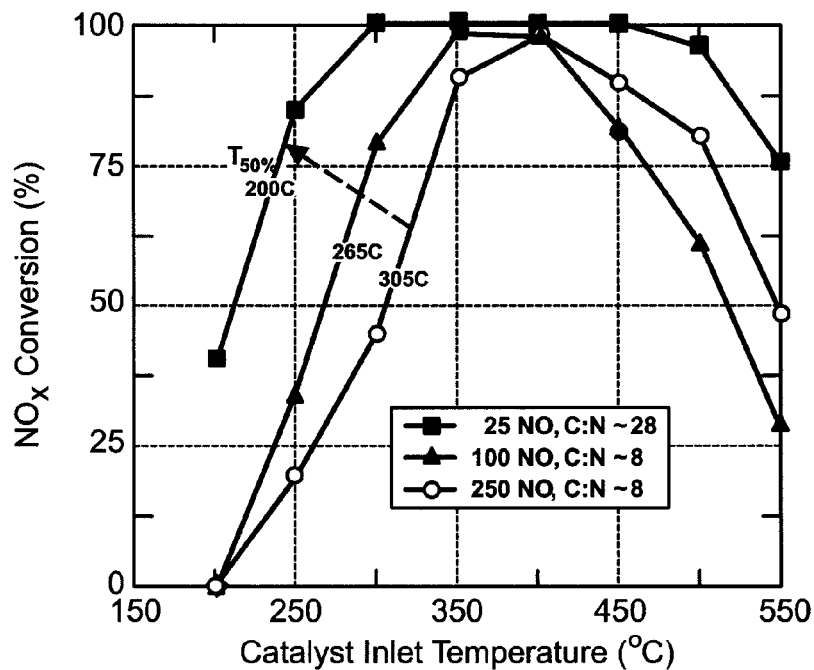

FIG. 14 comprises a graphical depiction of test results showing $NO_x$ conversion (%) across the sample of the Ag—Al catalyst, plotted as a function of catalyst inlet temperature (C) wherein SV was 12,500 $h^{-1}$, with an exhaust gas feedstream comprising 10% oxygen, 5% $H_2O$, 5% $CO_2$, 750 ppm CO, 250 ppm $H_2$, 25, 100 or 250 ppm NO, and varying ppm of the simulated diesel fuel to provide a $HC_1$:$NO_x$ ratio ranging from approximately 8:1 to 28:1.

Figure 15:
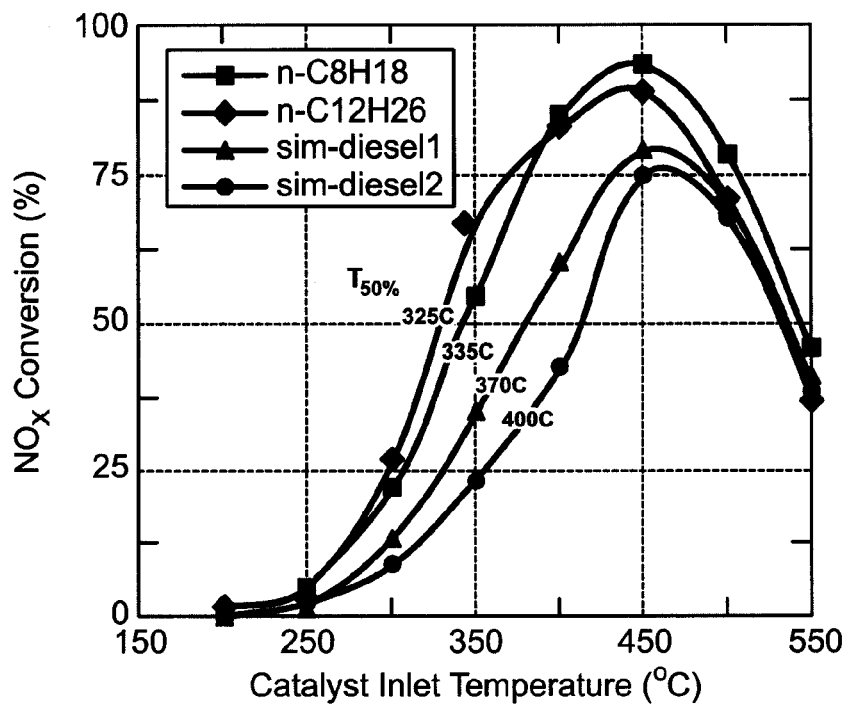

FIG. 15 comprises a graphical depiction of test results showing $NO_x$ conversion (%) across the sample of the Ag—Al catalyst, plotted as a function of catalyst inlet temperature (C) wherein SV was 50,000 $h^{-1}$, with an exhaust gas feedstream comprising 10% oxygen, 5% $H_2O$, 5% $CO_2$, 750 ppm CO, 250 ppm $H_2$, 250 ppm NO, and a $HC_1$:$NO_x$ ratio of approximately 8:1, and wherein different fuel compositions were used, including n-$C_8H_{18}$ (n-octane) and n-$C_{12}H_{26}$ (n-dodecane).

Figure 16:
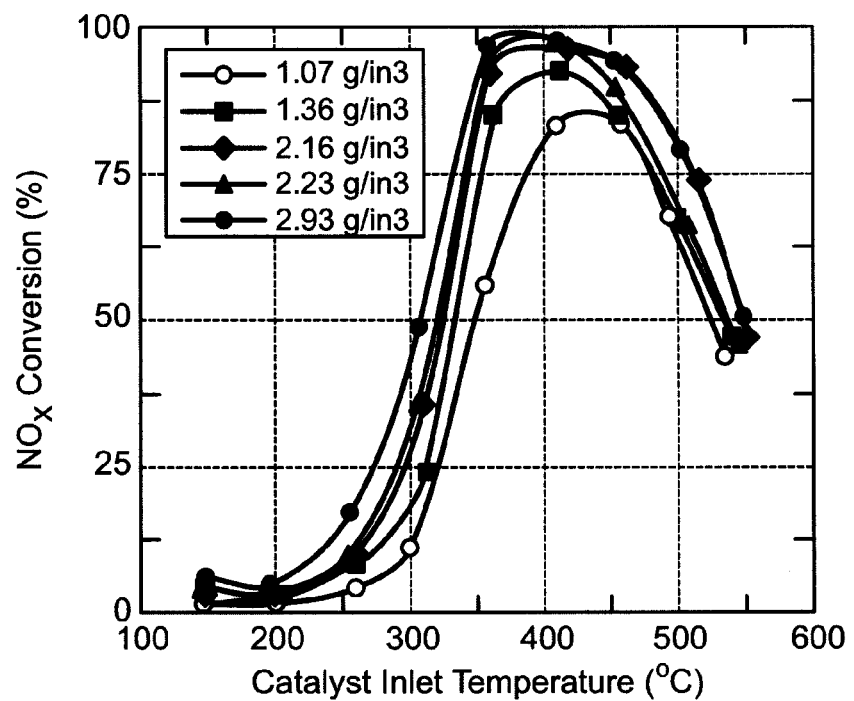

FIG. 16 comprises a graphical depiction of test results showing $NO_x$ conversion (%) across various samples of the Ag—Al catalyst, plotted as a function of catalyst inlet temperature (C) wherein SV was 50,000 $h^{-1}$, with an exhaust gas feedstream comprising 10% oxygen, 5% $H_2O$, 5% $CO_2$, 750 ppm CO, 250 ppm $H_2$, 200 ppm NO, using 250 ppm n-octane as reductant to provide a $HC_1$:$NO_x$ ratio of approximately 10:1, wherein washcoat loading was varied from 1.07 g/cu. in. to 2.93 g/cu. in. across the various samples.

Figure 17:
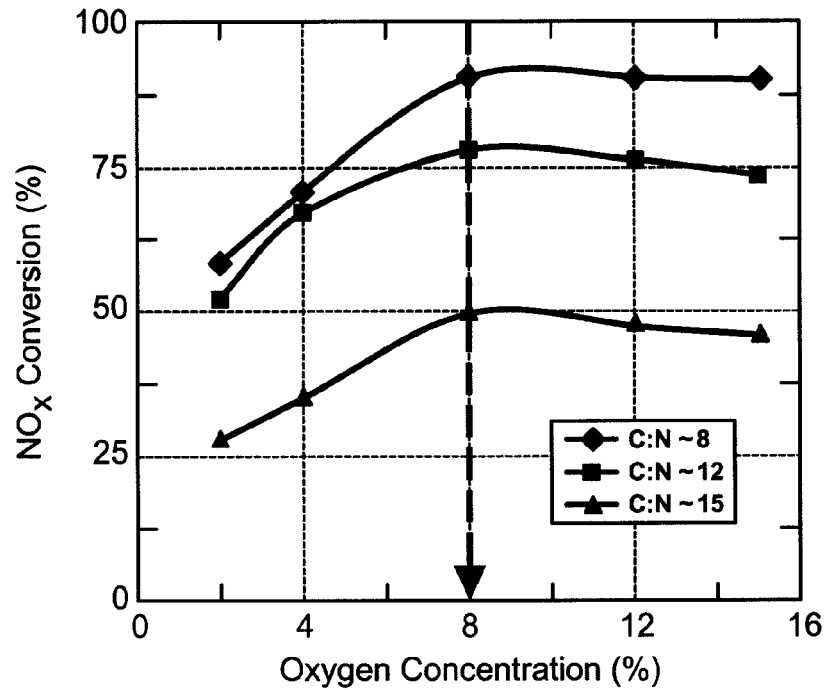

FIG. 17 comprises a graphical depiction of test results showing $NO_x$ conversion (%) across the sample of the Ag—Al catalyst, plotted as a function of oxygen concentration (%) wherein SV was 25,000 $h^{-1}$, exhaust gas temperature was 350° C., the sample catalyst had a washcoat loading of 2 wt. % $Ag_2O$, with an exhaust gas feedstream comprising oxygen ranging from 2% to 15%, 5% $H_2O$, 5% $CO_2$, 750 ppm CO, 250 ppm $H_2$, 250 ppm NO, and varying ppm of the simulated diesel fuel to provide a $HC_1$:$NO_x$ ratio ranging from approximately 8:1 to 15:1.

Figure 18:
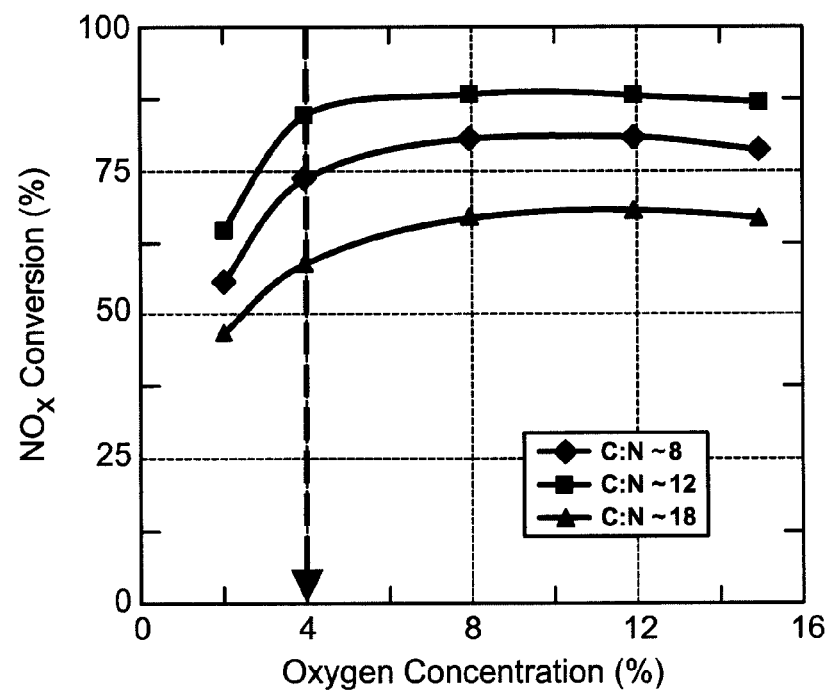

FIG. 18 comprises a graphical depiction of test results showing $NO_x$ conversion (%) across the sample of the Ag—Al catalyst, plotted as a function of oxygen concentration (%) wherein SV was 25,000 $h^{-1}$, exhaust gas temperature was 350° C., the sample catalyst had a washcoat loading of 3 wt. % $Ag_2O$, with an exhaust gas feedstream comprising oxygen ranging from 2% to 15%, 5% $H_2O$, 5% $CO_2$, 750 ppm CO, 250 ppm $H_2$, 250 ppm NO, and varying ppm of the simulated diesel fuel to provide a $HC_1$:$NO_x$ ratio ranging from approximately 8:1 to 18:1.

Figure 19:
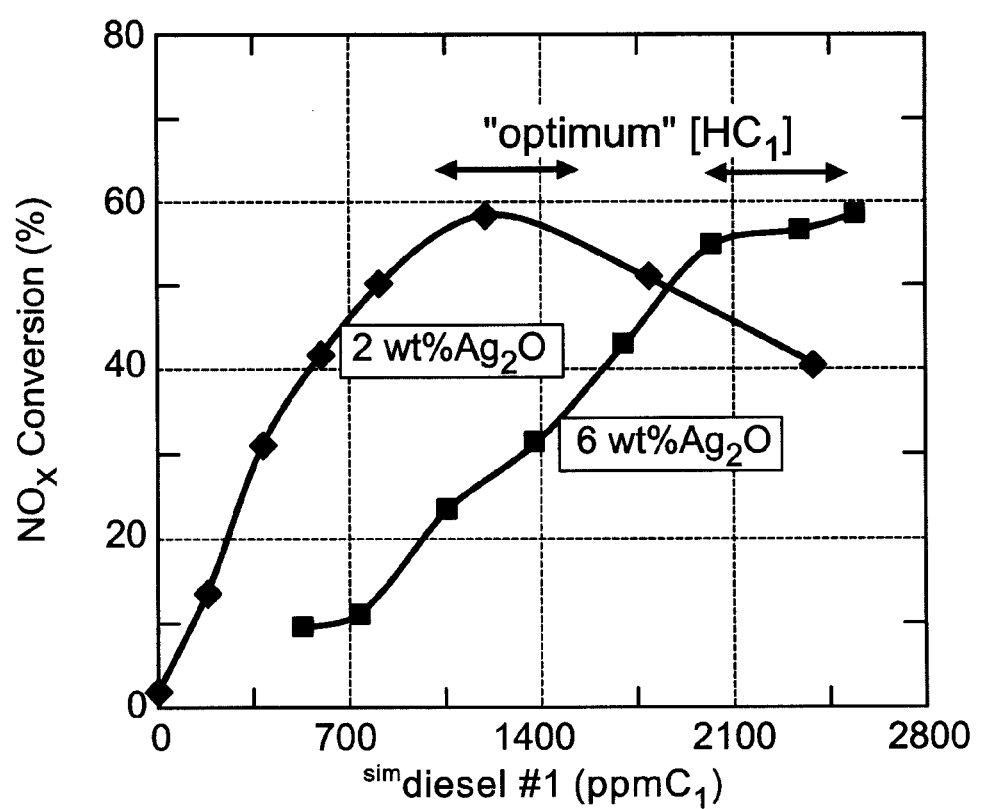

FIG. 19 comprises a graphical depiction of test results showing $NO_x$ conversion (%) across two samples of the Ag—Al catalyst, plotted as a function of reductant concentration, comprising simulated diesel fuel, measured in ppm$C_1$, wherein SV was 50,000 $h^{-1}$, exhaust gas temperature was 350° C., the sample catalysts having Ag loading of either 2 wt. % $Ag_2O$ or 6 wt. % $Ag_2O$, with an exhaust gas feedstream comprising 10% oxygen, 5% $H_2O$, 5% $CO_2$, 750 ppm CO, 250 ppm $H_2$, 100 ppm NO, and varying ppm of reductant comprising simulated diesel fuel to provide a $HC_1:NO_x$ ratio ranging from 0 to 25:1. Results indicate optimum $HC_1$ operating amounts (in ppm, $C_1$).

Results of the data presented with reference to FIGS. 1-15 indicate that for 2% Ag supported catalysts: $NO_x$ conversion is affected by SV (FIG. 1). At high SV, both the light-off temperature ($T_{50\%}$, temperature whereat 50% $NO_x$ conversion occurs) and peak temperature (temperature whereat maximum $NO_x$ conversion occurs) shift to higher temperature, with a corresponding decline in peak $NO_x$ conversion. In addition, under high exhaust flow rates (i.e., high SV) magnitudes of injected HC concentration, shown as $HC_1:NO_x$ ("C:N") ratios (FIG. 2) and $O_2$ concentration (FIG. 3) affect overall catalyst $NO_x$ efficiency, with the $NO_x$ efficiency increasing with increasing injected HC concentration and increasing $O_2$ concentration. The maximum $NO_x$ conversion declines and the peak temperature shifts to a higher temperature as the $O_2$ concentration decreases (FIG. 3); however, at lower SV and lower NO concentration (FIG. 4) this is not an issue. Increasing the fuel injection amount at high SV improves the maximum $NO_x$ conversion, but only at temperatures above 350° C. (FIG. 2). Thus, use of exhaust gas recirculation (hereinafter 'EGR') to control oxygen content in the exhaust feedstream and adding an appropriate amount of fuel to the exhaust feedstream can improve conversion levels as shown in FIGS. 2 and 3. Another technique to improve overall performance, particularly under high SV and low $O_2$ conditions, is through the use of a diesel oxidation catalyst or plasma ozone-generating device upstream of the HC—SCR catalyst to convert NO, i.e., a primary engine-out $NO_x$ species, to $NO_2$, to enhance performance at low $O_2$ concentrations (FIG. 5). However, the benefit is achieved principally at temperatures above 350° C. which may not be feasible under typical operating conditions due to thermal equilibrium favoring $NO_x$ as NO (not $NO_2$) and low $O_2$ concentration limiting NO oxidation to $NO_2$. Alternatively, the addition of small amounts of $H_2$ (1000-4000 ppm) improves the peak $NO_x$ performance and expands the operating temperature window of the catalyst with the exhaust $NO_x$ species as either NO or $NO_2$ (FIG. 6). Comparison of FIGS. 5 and 6 indicates a more pronounced benefit achieved with addition of $H_2$ relative to NO oxidation to $NO_2$. The effect of adding $H_2$ is most beneficial at high SV (FIG. 7), with the optimum amount of $H_2$ dependent on catalyst temperature (FIGS. 9-10). Addition of $H_2$ at temperatures below 250° C., or above 500° C., is generally not useful. Addition of $H_2$ at temperatures above 500° C. hinders catalyst performance due to acceleration of the HC oxidation reaction relative to the $NO_x$ reduction reaction. The results of FIG. 8 indicate that improvements in low temperature conversion (250-350° C.) over a wide range of space velocities (12,500-50,000 $h^{-1}$) and $NO_x$ concentrations (100-250 ppm) are obtained with approximately 2000 ppm $H_2$ in the exhaust feedstream. The $HC_1:NO_x$ ratio (FIG. 11) necessary to obtain maximum $NO_x$ conversion at low temperature (250-350° C.) varies widely ($HC_1:NO_x$ ratio ranging from about 4:1 to greater than 20:1) and is dependent on the SV and inlet $NO_x$ concentration. However, the absolute amount of HC fuel injected (FIG. 12) remains relatively constant at about 1200 ppm measured on a $C_1$ basis. Results shown with reference to FIGS. 11 and 12 indicate the importance of $H_2$ in overall $NO_x$ conversion efficiency, with very poor conversion at 350° C. and SV of 25,000 $h^{-1}$ with no $H_2$ present, even at high HC levels. At higher catalyst temperatures (>350° C.) more HC is required (FIGS. 4, 13) to improve the selectivity of the $NO_x$ reduction reaction relative to HC oxidation. Also note in FIG. 13 that at low SV (12,500 $h^{-1}$) more $H_2$ at low temperature lessens the requirement for injected HC, but at higher temperature more $H_2$ lowers the overall conversion efficiency (i.e., HC and $H_2$ trade-off). Therefore, in general, more $H_2$ (1000-4000 ppm) and lesser amounts of HC (<1200 ppm $C_1$) are required at lower catalyst temperatures (<350° C.), while more HC (>1200 ppm $C_1$) and lesser amounts of $H_2$ (<1000 ppm) are necessary at higher catalyst temperatures (>350° C.). FIG. 14 demonstrates the inlet $NO_x$ concentration decreasing from 250 to 25 ppm at low SV, with the low temperature performance improving significantly. Low temperature performance as well as peak $NO_x$ conversion varies as the fuel aromatic and polyaromatic content (33 vol. % m-xylene in a first simulated diesel fuel, 'sim-diesel1' and 23 vol. % m-xylene/10 vol. % naphthalene in a second simulated diesel fuel, 'sim-diesel2') changes (FIG. 15).

Furthermore, various washcoat loadings and Ag loadings were also examined at high SV (50,000 $h^{-1}$) using n-octane (FIG. 16) or simulated diesel fuel (FIGS. 17-19) as reductant. The optimum washcoat loading for a 2 wt. % $Ag_2O$ catalyst is shown as 2.93 g/cu. in. (FIG. 16). The maximum $NO_x$ conversion and the light-off temperature are both affected by the washcoat amount and active metal loadings. Comparison of results shown in FIGS. 17 and 18 demonstrates that more HC is required to reach maximum $NO_x$ conversion at 350° C. and 25,000 $h^{-1}$ for the 3 wt. % $Ag_2O$ catalyst ($HC_1:NO_x$ ratio of about 12) compared to the 2 wt. % $Ag_2O$ catalyst ($HC_1:NO_x$ ratio of about 8). In addition, there is less dependence on $O_2$ concentration at higher Ag loading. Results shown in FIG. 19 indicate that as Ag content in a catalyst increases, the amount of HC required increases at 350° C. and 50,000 $h^{-1}$. As demonstrated in FIGS. 16-19, different amounts of $O_2$ and HC, therefore $H_2$, are likely required in the exhaust feedstream under different operating conditions. The amounts of $O_2$ and HC, therefore $H_2$, likely required in the exhaust feedstream are dependent on factors of the catalyst composition comprising washcoat loading, Ag loading, and addition of other catalytic promoter elements, thereby affecting magnitude of specific control parameters described with reference to Table 1.

As described hereinabove, $NO_x$ reduction is achieved using the exemplary $Ag/Al_2O_3$ catalyst and hydrocarbons present on a vehicle as demonstrated by fuel-component and simulated fuel mixtures. The effects of space velocity, $NO_x$ as NO or $NO_2$, and concentration effects of $O_2$, $NO_x$, $H_2$, and HC on $NO_x$ reduction activity at typical diesel engine exhaust temperatures are provided.

Based on the data described with reference to FIGS. 1-19, control strategies to effectively maintain a maximum $NO_x$ reduction under various operating conditions in an exemplary HC—SCR aftertreatment system can be developed. Preferred control strategies using the 2% wt. supported Ag catalyst for eight engine operating conditions are detailed in Table 1, below, wherein the $O_2$ concentration, the $HC_1:NO_x$ ratio, and the $H_2$ concentration are selectively controlled based upon operating conditions of the exhaust gas feedstream. Specific exhaust gas feedstream operating conditions are described and defined as follows: catalyst temperature: High >350° C., and Low <350° C.; exhaust flow rate, in terms of space velocity: High $\geq$50,000 $h^{-1}$ and Low <15,000 $h^{-1}$; and, inlet $NO_x$ concentration: High >200 ppm, and Low $\leq$100 ppm.

TABLE 1

| | #1 | #2 | #3 | #4 |
|---|---|---|---|---|
| Operating Condition | | | | |
| Catalyst Temp | High | High | Low | High |
| Exhaust Flow Rate | High | High | High | Low |
| $NO_x$ Concentration | High | Low | High | High |
| Control Strategy for: | | | | |
| $O_2$ concentration | >10% | >10% | >10% | <10% |
| $HC_1$:$NO_x$ Ratio | 10 to 15 | 15 to 20 | 4 to 8 | 10-15 |
| $H_2$ Concentration (approximate) | 2000 ppm | 1000 ppm | 4000 ppm | 250 ppm |

| | #5 | #6 | #7 | #8 |
|---|---|---|---|---|
| Operating Condition | | | | |
| Catalyst Temp | Low | Low | Low | High |
| Exhaust Flow Rate | Low | Low | High | Low |
| $NO_x$ Concentration | High | Low | Low | Low |
| Control Strategy for: | | | | |
| $O_2$ concentration | 10% | 10% | >10% | <10% |
| $HC_1$:$NO_x$ Ratio | 10 to 15 | 15 to 20 | 10 to 15 | 15 to 20 |
| $H_2$ Concentration (approximate) | 1000 ppm | 1000 ppm | 4000 ppm | 250 ppm |

Figure 20:
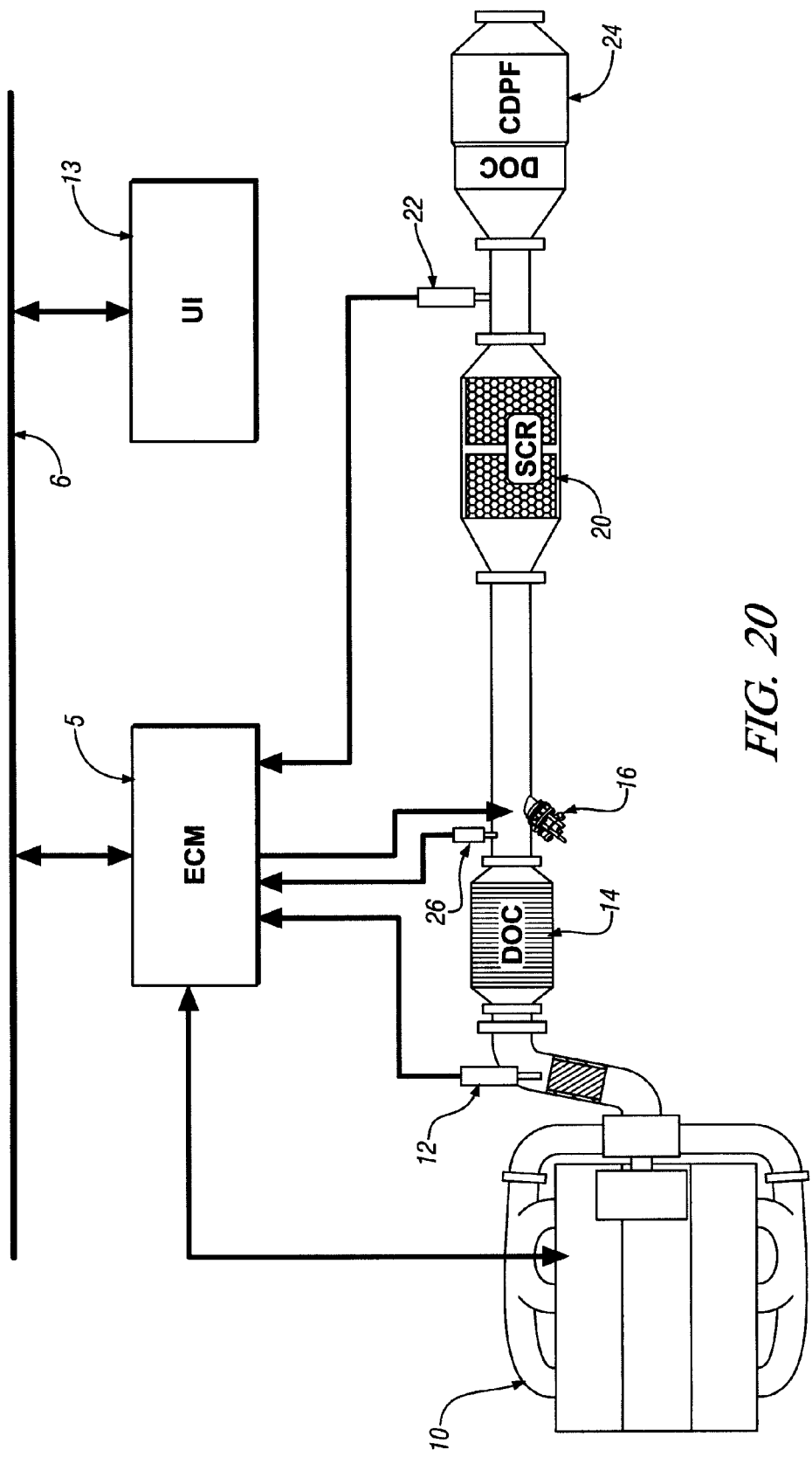
FIG. 20 is a schematic diagram of a powertrain system, in accordance with the present invention.

Referring now to FIG. 20, a schematic diagram depicts an embodiment of an internal combustion engine, exhaust aftertreatment system, and control system which has been constructed in accordance with the present invention. The exemplary engine and control system comprises a conventional four-cycle internal combustion engine 10 and electronic engine control module ('ECM') 5. The engine comprises a known compression-ignition engine having an operating regime that is primarily lean of stoichiometry. Alternatively, the engine 10 may comprise an engine employing any one of a number of engine control strategies which operate lean of stoichiometry, e.g., homogeneous-charge compression-ignition engines, and lean-burn spark-ignition engines. The engine 10 includes a plurality of reciprocating pistons attached to a crankshaft, which is operably attached to a vehicle driveline to deliver tractive torque to the driveline. The engine 10 generates an exhaust gas feedstream containing regulated constituent elements to be transformed by the aftertreatment system, typically including hydrocarbons ('HC'), carbon monoxide ('CO'), nitrides of oxygen ('$NO_x$'), and particulate matter ('PM'), among others.

The exhaust aftertreatment system comprises an integrated system intended to convert the constituent elements of the exhaust gas feedstream to harmless gases. An exhaust manifold entrains and directs exhaust gas flow to the exhaust aftertreatment system. The exemplary aftertreatment system includes devices comprising an oxidation catalyst ('DOC') 14, a selective catalyst reduction ('SCR') catalyst 20, and a second catalyst 24. The second catalyst 24 is shown as a second oxidation catalyst ('DOC') combined with a diesel particulate filter ('CDPF'). It is understood the second catalyst 24 can comprise, singly, or in combination, other known exhaust aftertreatment devices, including catalyzed or uncatalyzed diesel particulate filters, air pumps, external heating devices, sulfur traps, phosphorous traps, selective reduction devices, and others. Each of the exhaust aftertreatment devices comprise a device which employs technologies having various capabilities for treating the constituent elements of the exhaust gas feedstream, including oxidation, selective catalytic reduction, HC dosing, and particulate filtering. The devices are fluidly connected in series using known pipes and connectors.

The exemplary SCR device 20 comprises a silver-alumina catalyst supported on a substrate that is housed in a metallic assembly and assembled as an element of the exhaust system. Typically, the silver-alumina catalyst comprises a range of one to four weight percent (wt. %). Typically, the substrate comprises a metallic or ceramic monolithic device having a plurality of flow-through passages, with the catalyst coated on the walls of the passages. As previously described, the exemplary SCR device used for the results described herein comprises catalytic material having 2 wt. % $Ag_2O$ supported on alumina, with the catalytic material supported on a 400 cell per square inch cordierite monolith substrate. The exemplary SCR device is meant to be illustrative, and not restrictive.

The aftertreatment system includes sensing devices and systems preferably signally connected to the ECM 5. The sensing devices include a $NO_x$ sensor 12 operative to sense exhaust gases exiting the engine 10, a temperature sensor 26 operative to measure temperature of exhaust gases exiting the oxidation catalyst 14 and upstream of the SCR catalyst 20 to determine an operating temperature of the SCR catalyst 20, and exhaust gas sensing device 22 which is a second sensor operative to monitor constituent elements of exhaust gases after the SCR catalyst 20 for feedback and diagnostics. The $NO_x$ sensor 12 preferably comprises a sensor operative to generate an electrical signal correlatable to a parametric value for $NO_x$ concentration in the exhaust gas feedstream, and further operative to generate a second electrical signal correlatable to a parametric value for air/fuel ratio of the exhaust gas feedstream, from which oxygen content can be determined. The exhaust gas sensing device 22 preferably comprises a second $NO_x$ sensor 22, operative to generate an electrical signal correlatable to a parametric value for $NO_x$ concentration in the exhaust gas feedstream. Alternatively, $NO_x$ sensor 12 can comprise a virtual sensing device, wherein $NO_x$ concentration in the exhaust gas feedstream is determined based upon engine operating conditions, which is a known technique.

The exhaust aftertreatment system includes a hydrocarbon ('HC') dosing device 16 for injecting a controlled amount of HC reductant upstream of SCR catalyst 20. An exemplary HC dosing device is described in co-pending U.S. patent application Ser. No. 11/533,425, entitled APPARATUS AND METHOD TO INJECT A REDUCTANT INTO AN EXHAUST GAS FEEDSTREAM, which is incorporated by reference. The HC dosing device is operably connected to the ECM 5, which is adapted to control timing and quantity of HC injection, typically in the form of vehicle fuel, to the exhaust gas feedstream. Alternatively hydrocarbons from the engine may be used as reductant material to reduce $NO_x$ in the SCR catalyst, using a post-injection control strategy. In such an embodiment, the oxidation catalyst 14 may not be included in the aftertreatment system.

The control system preferably comprises a distributed control module architecture including a plurality of control modules adapted to provide coordinated control of the various vehicle systems including the powertrain system described herein. The control system is operable to monitor inputs from sensing devices, synthesize pertinent information, and execute algorithms to control various actuators to meet operator demands and achieve control targets, including such parameters as fuel economy, emissions, performance, driveability, and protection of hardware. The distributed controller architecture includes ECM 5, and User Interface ('UI') 13 which is operably connected to other devices through which a vehicle operator typically controls or directs operation of the vehicle and powertrain. Devices through which a vehicle operator provides input to the UI 13 typically include an accelerator pedal, a brake pedal, transmission gear selector, and, vehicle speed cruise control. Each of the aforementioned control modules and devices communicate with other control modules, devices, sensors, and actuators via a high-speed local area network ('LAN') bus, shown generally as item 6. The LAN bus 6 allows for structured communication of control parameters and commands between the various processors, control modules, and devices. The specific communication protocol utilized is application-specific. The LAN bus and appropriate protocols provide for robust messaging and multi-control module interfacing between the aforementioned control modules and other control modules providing functionality such as antilock brakes, traction control, and vehicle stability.

The ECM 5 comprises a central processing unit signally electrically connected to volatile and non-volatile memory devices via data buses. The ECM 5 is operably attached to sensing devices and other output devices to ongoingly monitor and control operation of the engine 10 and exhaust aftertreatment system, as shown. The output devices preferably include subsystems necessary for proper control and operation of the engine, including, by way of example, an air intake system, a fuel injection system, a spark-ignition system (when a spark-ignition engine is used, e.g., a homogeneous charge compression ignition engine), an exhaust gas recirculation ('EGR') system, and an evaporative control system. The engine sensing devices include devices operable to monitor engine operation, external conditions, and operator demand, and are typically signally attached to the ECM 5 via wiring harnesses.

Algorithms stored in the non-volatile memory devices are executed by the central processing unit and are operable to monitor inputs from the sensing devices and execute engine control and diagnostic routines to control operation of the engine, using preset calibrations. Algorithms are typically executed during preset loop cycles, with each control algorithm executed at least once each loop cycle. Loop cycles are typically executed each 3.125, 6.25, 12.5, 25 and 100 milliseconds during engine operation. Alternatively, control algorithms may be executed in response to occurrence of an event. A cyclical event, e.g. calculation of engine fueling, may be executed each engine cycle. A diagnostic algorithm may be executed once per engine key-on cycle. A diagnostic algorithm may have further limitations including requirements for achieving specific enablement criteria before execution. Use of the ECM 5 to control and diagnose operation of various aspects of the internal combustion engine 10 is well known to one skilled in the art.

Catalyst temperatures ranging from 150-550° C. are relevant to the exemplary application, as well as the following ranges of gas phase concentrations that the catalyst may potentially be exposed to: $O_2$ (2-20%), $NO_x$ (25-250 ppm), and $H_2$ (up to 8000 ppm) supplied by either a POx fuel reformer or in-cylinder combustion control such as post-injection. In addition, exhaust flow rates ranging from 10 L per second at idle to 75 L per second under acceleration conditions result in space velocities ranging from about 7,000 $h^{-1}$ to 54,000 $h^{-1}$ for a catalytic reactor device having a volume of 5.0 liters.

Heavier hydrocarbons (e.g., n-dodecane) that are present in diesel fuel provide $NO_x$ conversion at a lower temperature range, which facilitates introduction of secondary fuel injection into the exhaust gas. Addition of hydrogen to the feedstream lowers light-off temperature further for $NO_x$ conversion over $Ag/Al_2O_3$ catalysts for both light (propene, propane) and heavy (n-dodecane) hydrocarbons. Addition of carbon monoxide into the exhaust gas feedstream has not been shown to reduce $NO_x$ over $Ag/Al_2O_3$ catalysts.

The specific control strategy employed, i.e., HC injection amount versus $H_2$ injection amount versus $NO_2$ fraction described herein is ultimately dependent on the SV and temperature of the HC—SCR catalyst as well as the inlet $NO_x$ concentration. Care must be taken under conditions with low $O_2$ concentrations (<10%) and/or low temperatures (<350° C.) without excess $H_2$ addition in the feedstream (i.e., ≦250 ppm $H_2$) to ensure that excess amounts of HC are not injected so as to minimize coke formation and possible deactivation of the SCR catalyst.

Exhaust conditions that can be controlled during ongoing engine operation include the amount of injected diesel fuel, i.e., hydrocarbon ('HC') used for reduction of $NO_x$ over the SCR catalyst and the $H_2$ injection amount from either a POx fuel reformer or an in-cylinder post-injection control strategy. In addition, magnitude of EGR (in %) and PCCI ('premixed charge compression ignition') combustion can be used to lower engine-out $NO_x$ concentrations and vary $O_2$ concentration in the exhaust feedstream.

The invention comprises a method to selectively reduce the engine-out $NO_x$ concentration to $N_2$ in the exhaust gas feedstream using operating condition control of the exemplary internal combustion engine during operation lean of stoichiometry. It comprises determining a measure of $NO_x$ gases in the exhaust gas feedstream and a preferred hydrocarbon/$NO_x$ ratio based upon selected parameters of the exhaust gas feedstream; and, selectively dispensing the hydrocarbon reductant into the exhaust gas feedstream upstream of the Ag—Al catalytic reactor device 20. Fuel is the preferred reductant to reduce $NO_x$ in the silver-alumina catalytic reactor device 20. Engine operating conditions and exhaust gas temperature ranges are defined which yield optimum $NO_x$ conversion. The exhaust parameters of interest include catalyst operating temperature, the exhaust gas flow rate, $NO_x$ concentration, and oxygen concentration. The parameters are preferably used by the control system to calculate an optimum $HC_1/NO_x$ ratio for the $NO_x$ reduction under the specific operating conditions. The $HC_1/NO_x$ ratio is defined as an amount of injected fuel on a $C_1$ basis divided by the inlet $NO_x$ concentration (e.g., 1 ppm evaporated diesel fuel has approximately 14 carbon atoms; therefore, a $HC_1:NO_x$ ratio of 10 with 100 ppm inlet $NO_x$ in the exhaust feedstream requires injection of 10×100/14=71 ppm diesel fuel). The $HC_1/NO_x$ ratio is used to calculate and inject the correct fuel quantity for $NO_x$ reduction over the catalyst. The engine operating parameters are further used to calculate optimum hydrogen ($H_2$) concentration for $NO_x$ reduction, which can be injected into the exhaust feedstream using available methods such as a partial oxidation fuel reformer or an in-cylinder post-injection system. Criteria for selecting optimum catalyst volume for a given engine are defined, comprising volumetric exhaust gas flow rate/catalyst volume=space velocity in $h^{-1}$. Furthermore, methods described herein are effective to yield high $NO_x$ conversion at engine-out $O_2$ concentrations as low as 2%. Such engine control schemes as EGR and PCCI and other low temperature combustion strategies are employed to vary the engine-out $NO_x$ and $O_2$ concentrations to achieve optimum $NO_x$ conversion over the catalyst. Trade-offs between engine-out $NO_x$ levels and engine-out $O_2$ levels to yield the optimum $NO_x$ conversion are defined. An oxidation device such as a known diesel oxidation catalyst or a known plasma ozone-generating device can be used upstream of the $NO_x$ reduction catalyst to oxidize NO (primary engine-out $NO_x$ species) to $NO_2$ at low temperature to yield the optimum $NO_x$ conversion. Less fuel reductant and more $H_2$ are preferably injected at low temperatures. Conversely, more fuel reductant and less $H_2$ are injected at high temperatures. Higher quantities of $H_2$ are injected under high exhaust gas flow conditions. The aforementioned operating parameters are applicable to calculate an optimum $HC_1/NO_x$ ratio for $NO_x$ reduction, based upon on catalyst formulation, e.g., Ag-metal loading, washcoat loading, and addition of other non-Ag components. Use of such control strategies permits optimization of vehicle fuel economy while achieving maximum $NO_x$ reduction over the catalyst, through a combination of EGR, PCCI (low temperature) combustion, fuel quantity injected, and $H_2$ quantity injected. Furthermore, operating limits for use of injected reductant fuel under conditions of high space velocity, low $O_2$ concentration, and low temperature are definable to minimize potential coke formation (carbonaceous deposits) and possible catalyst deactivation without excess $H_2$ addition in the exhaust feedstream. Fuel components that yield the optimum $NO_x$ conversion can be identified.

The invention has been described with specific reference to the preferred embodiments and modifications thereto. Further modifications and alterations may occur to others upon reading and understanding the specification. It is intended to include all such modifications and alterations insofar as they come within the scope of the invention.

Having thus described the invention, it is claimed:

1. Method to selectively reduce $NO_x$ emissions in an exhaust gas feedstream of an internal combustion engine, comprising:
   determining a NOx concentration and a mass flow rate of the exhaust gas feedstream and an inlet temperature to a silver-alumina catalytic reactor device;
   determining a preferred hydrocarbon/NOx ratio to reduce the NOx concentration across the silver-alumina catalytic reactor device, the preferred hydrocarbon/NOx ratio varying in response to the NOx concentration, the mass flow rate of the exhaust gas feedstream and the inlet temperature to the silver-alumina catalytic reactor device;
   determining a quantity of hydrocarbon reductant that achieves the preferred hydrocarbon/NOx ratio in the exhaust gas feedstream upstream of the silver-alumina catalytic reactor device;
   dispensing the quantity of hydrocarbon reductant into the exhaust gas feedstream upstream of the silver-alumina catalytic reactor device; and
   selectively controlling a mass flow rate of hydrogen in the exhaust gas feedstream upstream of the silver-alumina catalytic reactor device.

2. The method of claim 1, wherein the preferred hydrocarbon/$NO_x$ ratio comprises a $HC_1/NO_x$ ratio in a range between 10:1 and 15:1 when the inlet temperature is high, the mass flow rate is high and the $NO_x$ concentration is high.

3. The method of claim 1, wherein the preferred hydrocarbon/$NO_x$ ratio comprises a $HC_1/NO_x$ ratio in a range between 15:1 and 20:1 when the inlet temperature is high, the mass flow rate is high and the $NO_x$ concentration is low.

4. The method of claim 1, wherein the preferred hydrocarbon/$NO_x$ ratio comprises a $HC_1/NO_x$ ratio in a range between 4:1 and 8:1 when the inlet temperature is low, the mass flow rate is high and the $NO_x$ concentration is high.

5. The method of claim 1, wherein the preferred hydrocarbon/$NO_x$ ratio comprises a $HC_1/NO_x$ ratio in a range between 10:1 and 15:1 when the inlet temperature is high, the mass flow rate is low and the $NO_x$ concentration is high.

6. The method of claim 1, wherein the preferred hydrocarbon/$NO_x$ ratio comprises a $HC_1/NO_x$ ratio in a range between 10:1 and 15:1 when the inlet temperature is low, the mass flow rate is low, and the $NO_x$ concentration is high.

7. The method of claim 1, wherein the preferred hydrocarbon/$NO_x$ ratio comprises a $HC_1/NO_x$ ratio in a range between 15:1 and 20:1 when the inlet temperature is low, the mass flow rate is low, and the $NO_x$ concentration is low.

8. The method of claim 1, wherein the preferred hydrocarbon/$NO_x$ ratio comprises a $HC_1/NO_x$ ratio in a range between 10:1 and 15:1 when the inlet temperature is low, the mass flow rate is high, and the $NO_x$ concentration is low.

9. The method of claim 1, wherein the preferred hydrocarbon/$NO_x$ ratio comprises a $HC_1/NO_x$ ratio in a range between 15:1 and 20:1 when the inlet temperature is high, the mass flow rate is low, and the $NO_x$ concentration is low.

10. The method of claim 1, further comprising oxidizing engine-out $NO_x$ to $NO_2$ in the exhaust gas feedstream upstream of the selectively dispensed hydrocarbon reductant into the exhaust gas feedstream.

11. The method of claim 1, further comprising selectively increasing the mass flow rate of hydrogen in the exhaust gas feedstream and selectively decreasing a mass flow of the dispensed hydrocarbon reductant with decreasing inlet temperature.

12. The method of claim 1, further comprising selectively controlling oxygen in the exhaust gas feedstream upstream of the silver-alumina catalytic reactor device.

13. The method of claim 1, further comprising controlling oxygen concentration to greater than 10% and hydrogen concentration to about 2000 ppm when the inlet temperature is high, the mass flow rate is high and the $NO_x$ concentration is high.

14. The method of claim 1, further comprising controlling oxygen concentration to greater than 10% and hydrogen concentration to about 1000 ppm when the inlet temperature is high, the mass flow rate is high and the $NO_x$ concentration is low.

15. The method of claim 1, further comprising controlling oxygen concentration to greater than 10% and hydrogen concentration to about 4000 ppm when the inlet temperature is low, the mass flow rate is high and the $NO_x$ concentration is high.

16. The method of claim 1, further comprising controlling oxygen concentration to less than 10% and hydrogen concentration to about 250 ppm when the inlet temperature is high, the mass flow rate is low and the $NO_x$ concentration is high.

17. The method of claim 1, further comprising controlling oxygen concentration to about 10% and hydrogen concentration to about 1000 ppm when the inlet temperature is low, the mass flow rate is low and the $NO_x$ concentration is high.

18. The method of claim 1, further comprising controlling oxygen concentration to about 10% and hydrogen concentration to about 1000 ppm when the inlet temperature is low, the mass flow rate is low, and the $NO_x$ concentration is low.

19. The method of claim 1, further comprising controlling oxygen concentration to greater than 10% and hydrogen concentration to about 4000 ppm when the inlet temperature is low, the mass flow rate is high and the $NO_x$ concentration is low.

20. The method of claim 1, further comprising controlling oxygen concentration to less than 10% and hydrogen concentration to about 250 ppm when the inlet temperature is high, the mass flow rate is low and the $NO_x$ concentration is low.

21. The method of claim 1, wherein dispensing the quantity of hydrocarbon reductant into the exhaust gas feedstream upstream of the silver-alumina catalytic reactor device comprises metering a mass of the hydrocarbon reductant into the exhaust system during lean operation of the engine.

22. The method of claim 1, further comprising selectively decreasing the mass flow rate of hydrogen in the exhaust gas feedstream and selectively increasing the mass flow of the dispensed hydrocarbon reductant with increasing inlet temperature.

23. The method of claim 22, further comprising selectively increasing the mass flow rate of hydrogen into the exhaust gas feedstream with increasing exhaust gas flow rate.

24. The method of claim 1, wherein the hydrocarbon reductant comprises engine fuel.

25. The method of claim 24, wherein dispensing the quantity of hydrocarbon reductant into the exhaust gas feedstream upstream of the silver-alumina catalytic reactor device comprises selectively actuating an engine fuel injector post-injection to inject the engine fuel.

26. Method to control $NO_x$ concentration output from an exhaust aftertreatment system comprising a silver-alumina catalytic reactor device during lean operation of an internal combustion engine, comprising:

determining a preferred hydrocarbon/$NO_x$ ratio to achieve a NOx emissions reduction across the silver-alumina catalytic reactor device, the preferred hydrocarbon/NOx ratio varying in response to a NOx concentration and a mass flow rate of the exhaust gas feedstream and an inlet temperature to the silver-alumina catalytic reactor device;

controlling a concentration of engine-out $NO_x$;

controlling a concentration of engine-out oxygen;

determining a quantity of hydrocarbon reductant that achieves the hydrocarbon/NOx ratio for the NOx concentration;

selectively dispensing the quantity of hydrocarbon reductant into the exhaust gas feedstream upstream of the silver-alumina catalytic reactor device; and, selectively controlling a mass flow rate of hydrogen into the exhaust gas feedstream upstream of the silver-alumina catalytic reactor device.

27. The method of claim 26, wherein controlling the concentration of engine-out $NO_x$ comprises controlling exhaust gas recirculation in the internal combustion engine.

28. The method of claim 26, wherein controlling the concentration of engine-out oxygen comprises controlling magnitude of pre-mixed charge compression-ignition combustion of the internal combustion engine.

29. The method of claim 26, wherein controlling the concentration of engine-out oxygen comprises controlling air/fuel ratio of the internal combustion engine.

30. The method of claim 26, wherein the hydrocarbon reductant comprises engine fuel.

* * * * *